United States Patent
Yoon

[11] Patent Number: 6,091,583
[45] Date of Patent: Jul. 18, 2000

[54] PLANAR SILICON HEAD WITH STRUCTURE PROTECTED FROM OVERCURRENT/OVERVOLTAGE

[75] Inventor: Woo-Young Yoon, Gumi, Rep. of Korea

[73] Assignee: Samsung Electronics. Co., Ltd., Suwon, Rep. of Korea

[21] Appl. No.: 09/063,064

[22] Filed: Apr. 21, 1998

[30] Foreign Application Priority Data

Apr. 21, 1997 [KR] Rep. of Korea ................. 97-14747

[51] Int. Cl.[7] .................................................. G11B 5/40
[52] U.S. Cl. ................................................... 360/126
[58] Field of Search ............................ 360/126, 123, 360/124

[56] References Cited

U.S. PATENT DOCUMENTS

| | | | |
|---|---|---|---|
| 4,727,643 | 3/1988 | Schewe et al. | 29/603 |
| 4,760,481 | 7/1988 | Yuito et al. | 360/123 |
| 4,800,454 | 1/1989 | Schwarz et al. | 360/103 |
| 4,809,103 | 2/1989 | Lazzari | 360/103 |
| 4,819,112 | 4/1989 | Iwata et al. | 360/126 |
| 4,881,144 | 11/1989 | Yuito et al. | 360/125 |
| 4,939,835 | 7/1990 | Coutellier et al. | 29/603 |
| 4,949,207 | 8/1990 | Lazzari | 360/119 |
| 5,132,705 | 7/1992 | Takeuchi et al. | 346/76 PH |
| 5,272,582 | 12/1993 | Shibata et al. | 360/113 |
| 5,274,521 | 12/1993 | Miyauchi et al. | 360/119 |
| 5,282,308 | 2/1994 | Chen et al. | 29/603 |
| 5,283,942 | 2/1994 | Chen et al. | 29/603 |
| 5,333,086 | 7/1994 | Frey et al. | 360/126 |
| 5,434,733 | 7/1995 | Hesterman et al. | 360/113 |
| 5,452,166 | 9/1995 | Aylwin et al. | 360/126 |
| 5,566,442 | 10/1996 | Gaud et al. | 29/603.14 |
| 5,684,660 | 11/1997 | Gray et al. | 360/126 |

*Primary Examiner*—Brian E. Miller
*Attorney, Agent, or Firm*—Robert E. Bushnell, Esq.

[57] ABSTRACT

A planar silicon head with a structure protected from an overcurrent/overvoltage and a method for fabricating the same. The planar silicon head includes a yoke formed on a silicon substrate, the yoke having a gap for reading and writing data; a hole formed in the silicon substrate, the hole having a conductive layer deposited therein; an internal connector formed at one end of the hole; and a bump formed at the other end of the hole, for forming an electrode including a conductive polymer layer which changes into an insulator with respect to an overcurrent or an overvoltage.

15 Claims, 16 Drawing Sheets

PLANAR SILICON HEAD WITH STRUCTURE PROTECTED FROM OVERCURRENT/OVERVOLTAGE

CLAIM FOR PRIORITY

This application makes reference to, incorporates the same herein, and claims all benefits accruing under 35 U.S.C. §119 from an application for PLANAR SILICON HEAD WITH STRUCTURE PROTECTED FROM OVERCURRENT/OVERVOLTAGE AND METHOD FOR FABRICATING THE SAME earlier filed in the Korean Industrial Property Office on Apr. 21, 1997, and there duly assigned Serial No. 14747/1997, a copy of which application is annexed hereto.

BACKGROUND OF THE INVENTION

1. Technical Field

The present invention relates to a magnetic read/write head, and in particular, to a planar silicon head with a structure protected from an overcurrent/overvoltage and a method for fabricating the same.

2. Related Art

Magnetic heads are used for reading and writing magnetically coded data stored on a magnetic storage medium such as a magnetic disk. An inductive magnetic head generally includes two conductive layers, called poles, separated by an insulating layer. Conductive wires are embedded within the insulating layer between the poles. The insulating layer is typically narrowest near the tips of the poles. The portion of the insulating layer near the pole tips is called the front gap, and the thickness of the insulating layer between the pole tips is called the gap length. Typically, the substrate on which the layers have been deposited is formed into a slider defining one of more air bearing surfaces. Examples of inductive magnetic head are disclosed in U.S. Pat. No. 4,727,643 for Method For Manufacturing A Magnetic Head By A Thin-Film Technique issued to Schewe et al., U.S. Pat. No. 5,333,086 for Thin Film Two-Pole Inductive Magnetic Head With Minimized Secondary Pulses issued to Frey et al., and U.S. Pat. No. 5,452,166 for Thin Film Magnetic Recording Head For Minimizing Undershoots And A Method For Manufacturing The Same issued to Aylwin et al.

A planar structure magnetic head has lower inductance than inductive magnetic heads. As a result, planar structure magnetic heads are widely substituted for inductive magnetic heads. There are a number of different planar structure magnetic heads and fabrication processes as disclosed, for example, in U.S. Pat. No. 4,949,207 for Planar Structure Thin Film Magnetic Head issued to Lazzari, U.S. Pat. No. 5,282,308 for Thin Film Planarization Process For Fabricating Magnetic Heads Employing A Stitched Pole Structure issued to Chen et al., U.S. Pat. No. 5,283,942 for Sacrificial Layer Planarization Process For Fabricating A Narrow Thin Film Inductive Head issued to Chen et al., and U.S. Pat. No. 5,434,733 for Planar Head Having Separate Read And Write Gaps issued to Hesterman et al. Typically, the planar silicon head is formed by a drilling process for drilling holes in a silicon substrate to form an electrode, an electroplating process for forming pole pieces, a gap forming process for forming a gap positioned in the upper pole piece, and a bump forming process for forming bumps positioned at the rear of the head. However, I have observed that internal connector for most planar silicon heads is not uniformly plated due to surface contamination. As such, each time an overvoltage/ overcurrent is applied through the head connector, the connector is corroded by metallic stress and contamination. If the current continues to flow, the corrosion becomes severe, and the internal connector is disconnected. As a result, the planar silicon head loses its intended function. Accordingly, an improved planar silicon head for reading and writing magnetically coded data stored on a magnetic storage medium is still desired.

SUMMARY OF THE INVENTION

Accordingly, it is therefore an object of the present invention to provide an improved planar silicon head protected from an overvoltage/overcurrent.

It is also an object to provide a process of fabricating a planar silicon head protected from an overvoltage/ overcurrent.

It is another object to provide a method for improving a bump forming process during fabrication so as to protect a planar silicon head from an overvoltage/overcurrent.

These and other objects of the present invention can be achieved by a planar silicon with a structure protected from overvoltage and overcurrent, comprising: a silicon substrate having at least a hole formed therein, and the hole having a conductive layer deposited thereon; a yoke and conduction coils formed on a silicon substrate, and the yoke having a gap for reading and writing data on a storage medium; an internal connector formed at one end of the hole, and electrically connected to the conduction coils; and a bump having at least a conductive polymer layer formed at the other end of said hole, for forming an electrode, and the conductive polymer layer exhibiting characteristics of an insulator when one of a current over a rated current and a voltage over a rated voltage is applied to the conduction coils. Preferably, the conductive polymer layer has a thickness of approximately 10–18 micrometers ($\mu$m).

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
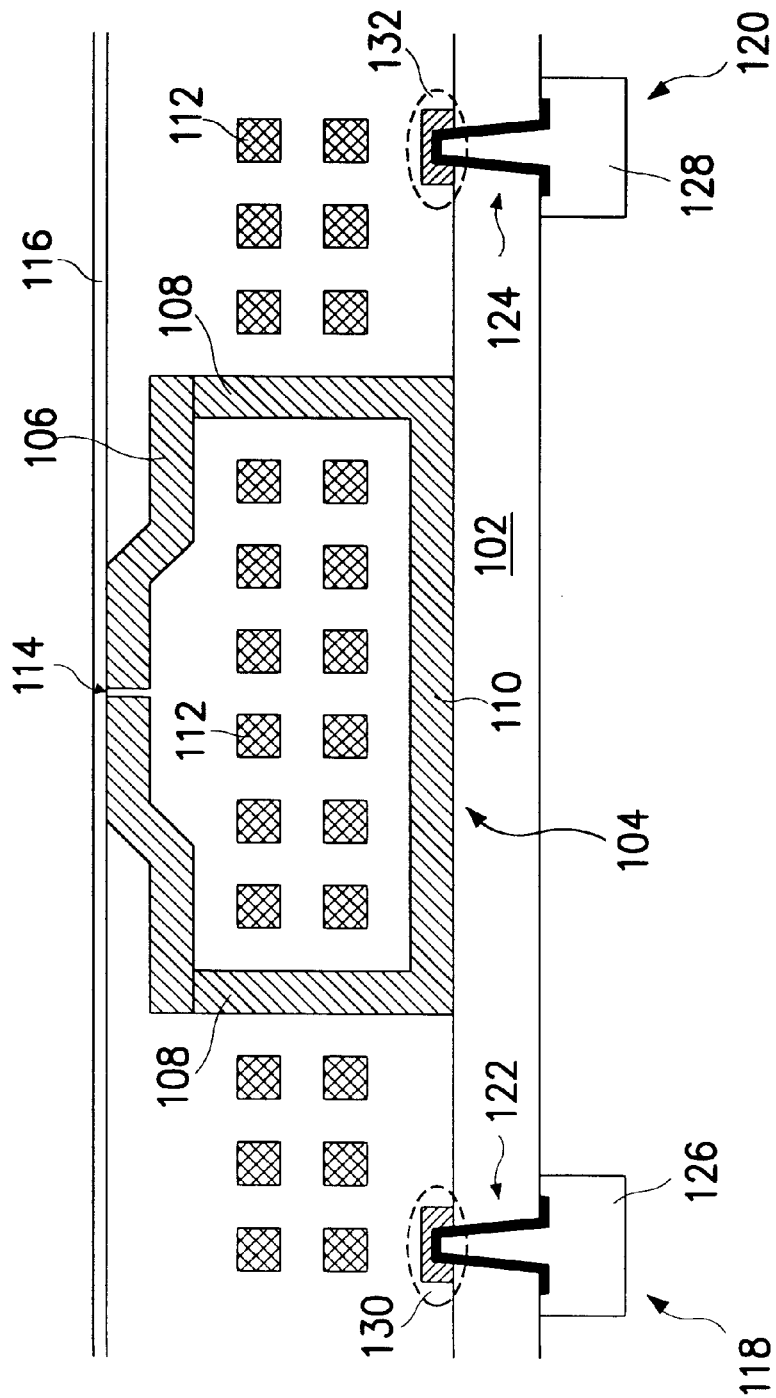
FIG. 1 illustrates a structure of a planar silicon head according to the principles of the present invention.

Referring now to the drawings and particularly to FIG. 1, which illustrates the structure of a planar silicon head according to the principles of the present invention. On a silicon substrate 102, a yoke 104 consisting of an upper pole piece (UPP) 106, a pillar 108 and a lower pole piece (LPP) 110 is formed. Generally, the yoke 104 is made of permalloy (NiFe) which is a magnetic substance. The pillar 108 of the yoke 104 is wound with coils 112. A read/write gap 114 for reading/writing data is formed between pole tips of the upper pole piece 106. A layer 116 coated with diamond-like carbon is formed on the upper pole piece 106. Head connectors 118 and 120 electrically connected to the head are formed at the rear of the silicon substrate 102.

The structure of the head connectors 118 and 120 situated at both sides of the lower pole piece 110 of the yoke 104 is described as follows. Holes 122 and 124 which are electrically connected to a coil of the head and include a conductive layer therein are formed in the silicon substrate 102. Bumps 126 and 128 which are connected to a head wire installed at a suspension of an actuator and include an electrode layer are formed at the exterior of the holes 122 and 124. Internal connectors 130 and 132 electrically connected to the coil are formed at the interior of the holes 122 and 124. The internal connectors 130 and 132 are formed by the permalloy (NiFe) for example.

As shown in FIG. 1, the planar silicon head is designed and fabricated differently from widely used inductive magnetic heads. As main fabrication processes of the planar silicon head, there are a drilling process for drilling the holes 122 and 124 in the silicon substrate 102 in order to form an electrode, an electroplating process for forming the upper pole piece 106, the pillar 108, the lower pole piece 110, etc., a gap forming process for forming the gap 114 positioned in the upper pole piece 106, and a bump forming process for forming the bumps 126 and 128 positioned at the rear of the head.

As I have noted however, the planar silicon head of such examples has a probability that the material NiFe of internal connector is not uniformly plated due to contamination of a surface. That is, the material constituting the internal connector may not satisfy uniform plating conditions. In such case, each time an overvoltage/overcurrent is applied through the head connector, the connector is corroded by metallic stress and contamination. If the current continues to flow, the corrosion becomes severe. Then the internal connector is disconnected, and the planar silicon head loses its intended function.

FIGS. 2A to 5F illustrate detailed steps of the main processes for fabricating the planar silicon head as shown in FIG. 1, that is, the drilling process of drilling holes 122 and 124 in a silicon substrate 102 to form an electrode, the electroplating process of forming the upper pole piece 106, the pillar 108, the lower pole piece 110, etc., the gap forming process of forming a gap 114 positioned in the upper pole piece 106, and the bump forming process of forming bumps 126 and 128 positioned at the rear of the head.

Figure 2A:
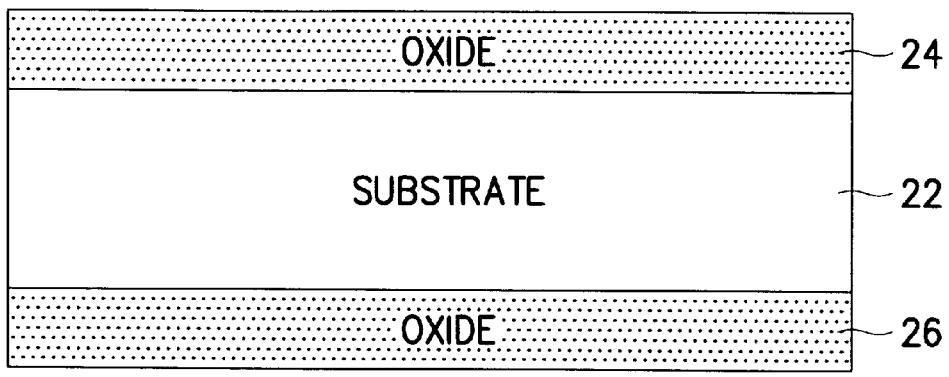
FIGS. 2A to 2E are vertical cross-sectional views illustrating a drilling process of a planar silicon head.
Figure 2B:
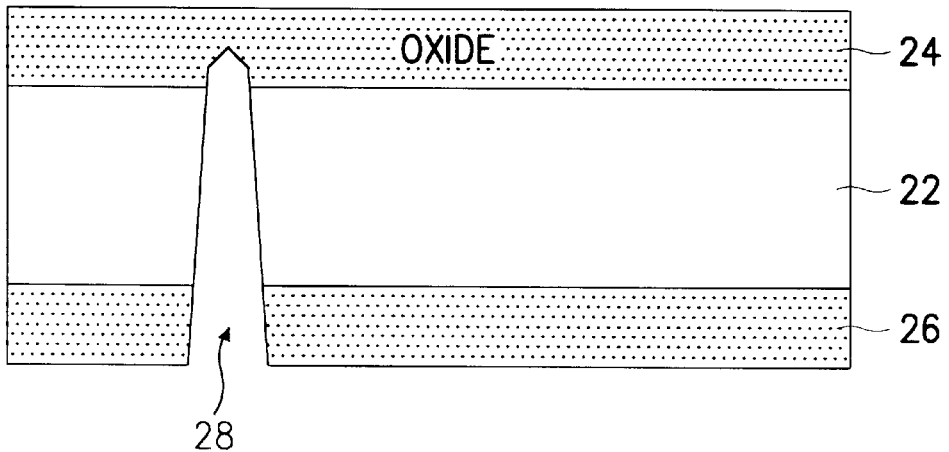
Figure 2C:
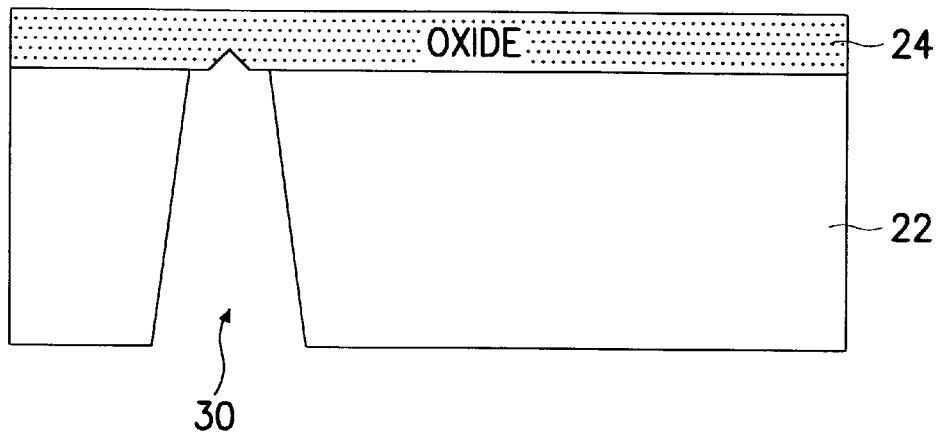
Figure 2D:
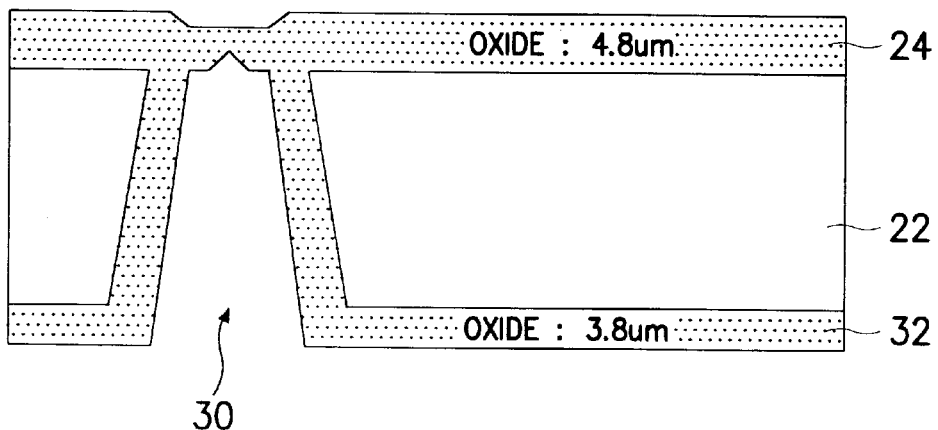
Figure 2E:
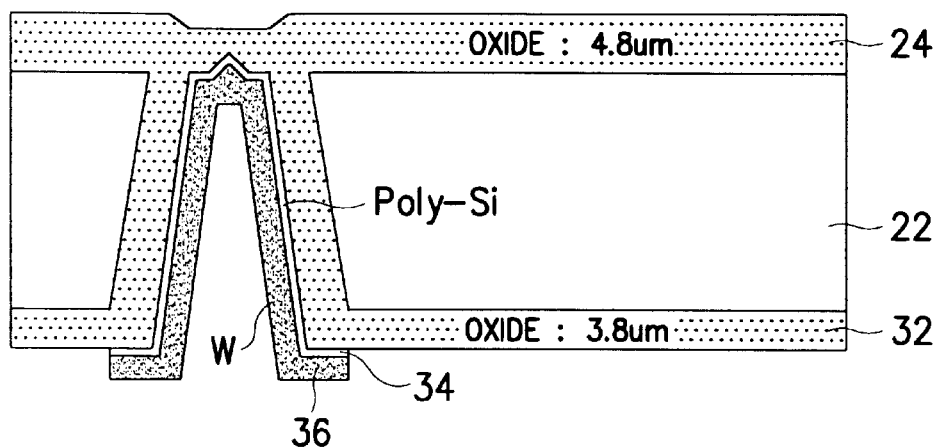

The drilling process of drilling the holes 122 and 124 in the silicon substrate 102 to form an electrode is illustrated in FIGS. 2A to 2E. First, oxide layers 24 and 26 are respectively deposited on both surfaces of a silicon substrate 22 as shown in FIG. 2A. By using a laser beam, a hole 28 is formed from the rear of the silicon substrate 22 as shown in FIG. 2B. The hole 28 is then widened by etching the silicon substrate 22 using a KOH solution and the oxide layer 24 deposited on the rear of the substrate 22 is removed as shown in FIG. 2C. An oxide layer 32 is then deposited on the back surface of the substrate 22 as shown in FIG. 2D. A polycrystalline silicon 34 is deposited on a widened hole 30 and a tungsten (W) electrode 36 is formed thereon as shown in FIG. 2E. Preferably, the oxide layer 24 formed on the top surface of the silicon substrate 22 has a thickness of approximately 4.8 µm, and the oxide layer 32 formed on the back surface of the silicon substrate 22 has a thickness of approximately 3.8 µm.

Figure 3A:
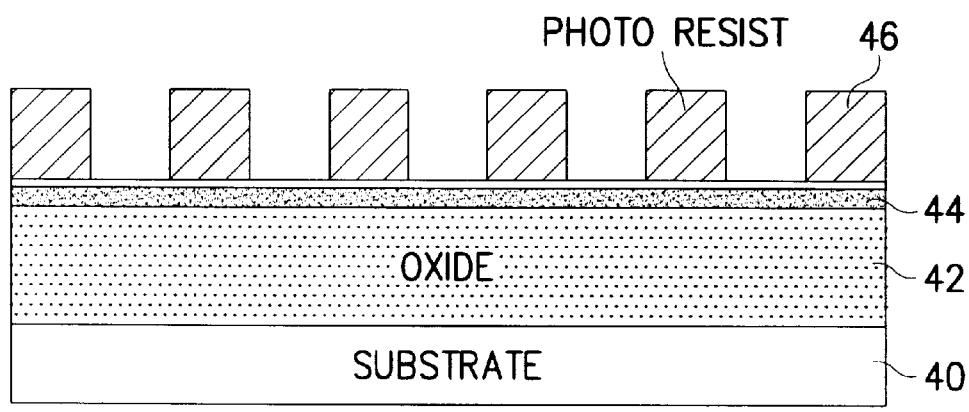
FIGS. 3A to 3F are vertical cross-sectional views illustrating an electroplating process of a planar silicon head.
Figure 3B:
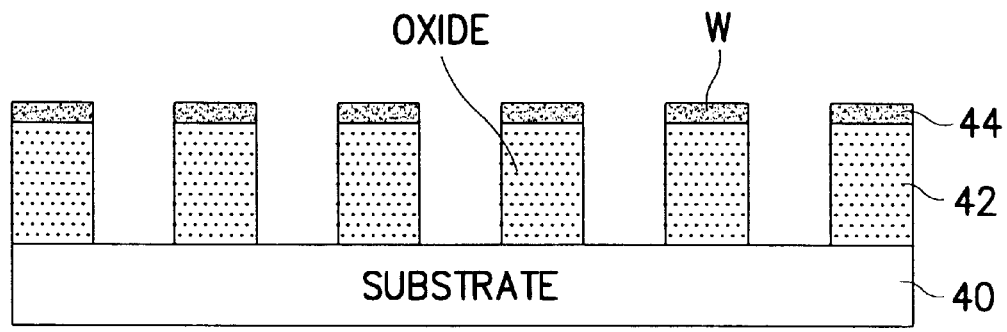
Figure 3C:
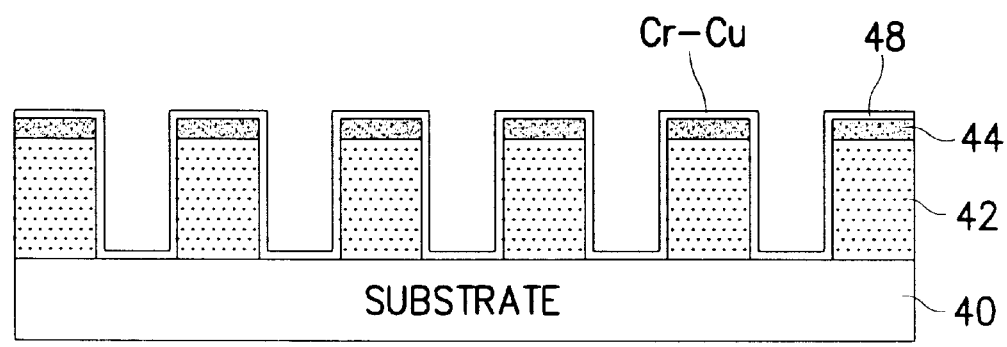
Figure 3D:
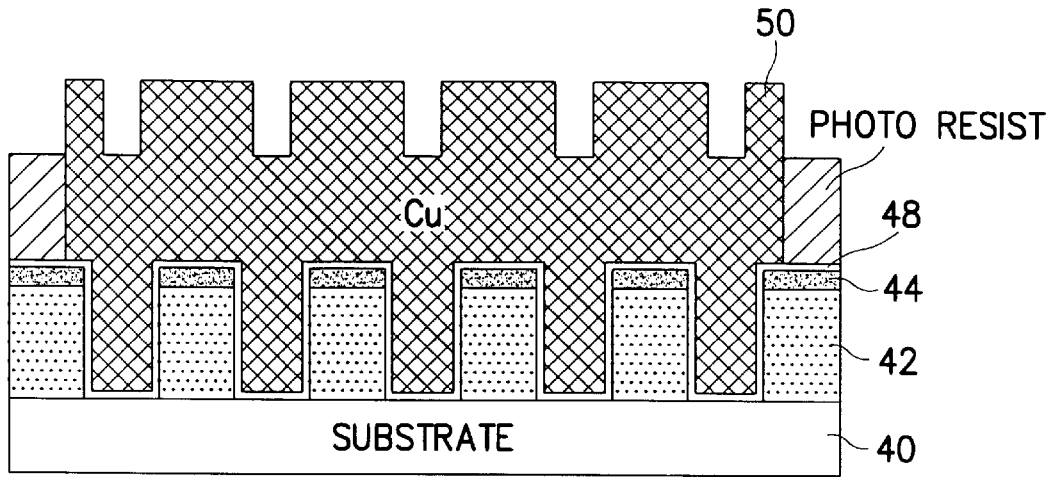
Figure 3E:
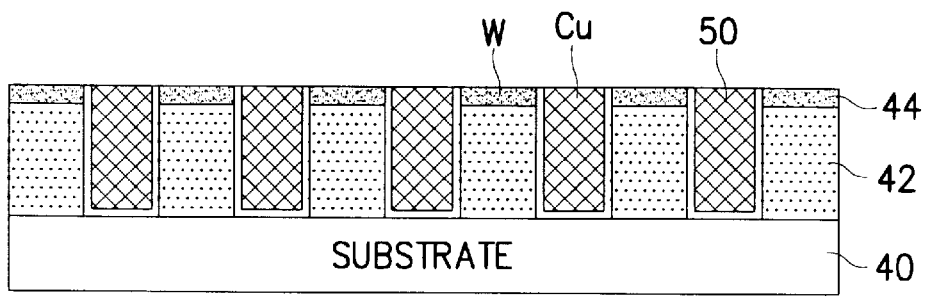
Figure 3F:
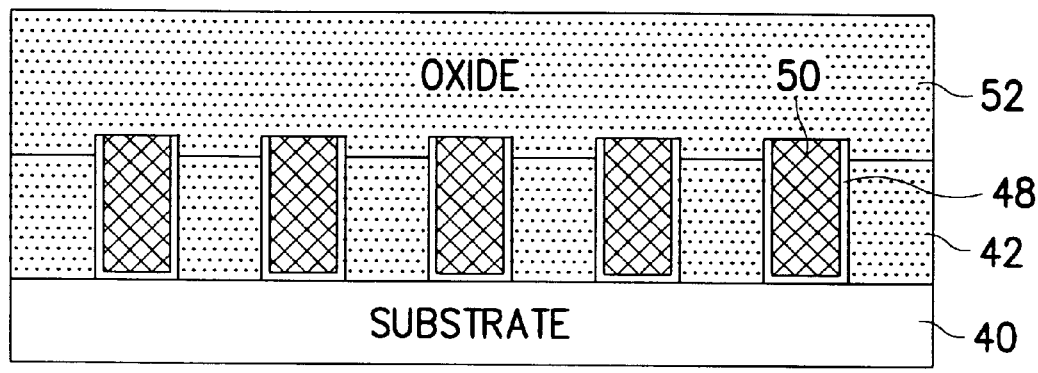

The electroplating process of forming the upper pole piece 106, the pillar 108, the lower pole piece 110 and the coil of a planar silicon head is illustrated in FIGS. 3A to 3F. First, an oxide layer 42 and a tungsten layer 44 are sequentially deposited on the substrate 40 and a photoresist 46 is formed to open a window by typical lithography as shown in FIG. 3A. The tungsten layer 44 and the oxide layer 42 are etched by wet chemical etching as shown in FIG. 3B. A chromium-copper (Cr—Cu) layer 48 is deposited over the entire surface of the substrate 40 as shown in FIG. 3C. A pattern of a photoresist is formed by the lithography. A copper layer 50 or a permalloy (NiFe) layer is formed by electroplating as shown in FIG. 3D, and then mechanically polished as shown in FIG. 3E. The tungsten layer 44 is etched and an oxide layer 52 is deposited over the entire substrate 40 as shown in FIG. 3F.

Figure 4A:
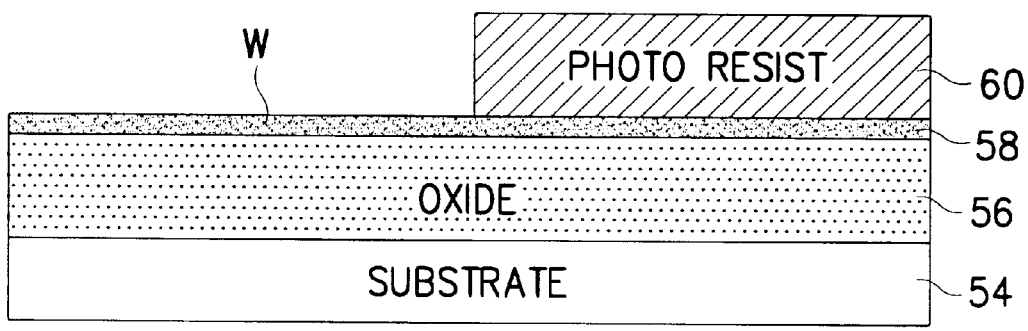
FIGS. 4A to 4E are vertical cross-sectional views illustrating a gap forming process of a planar silicon head.
Figure 4B:
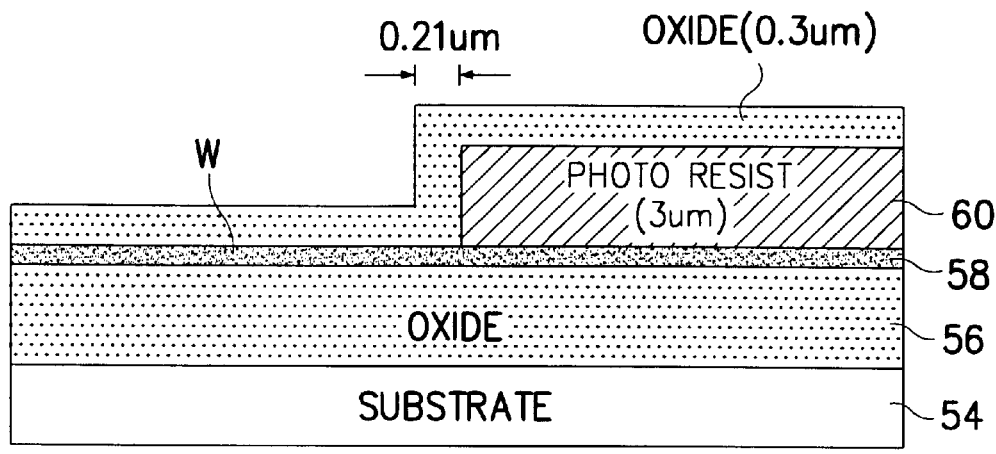
Figure 4C:
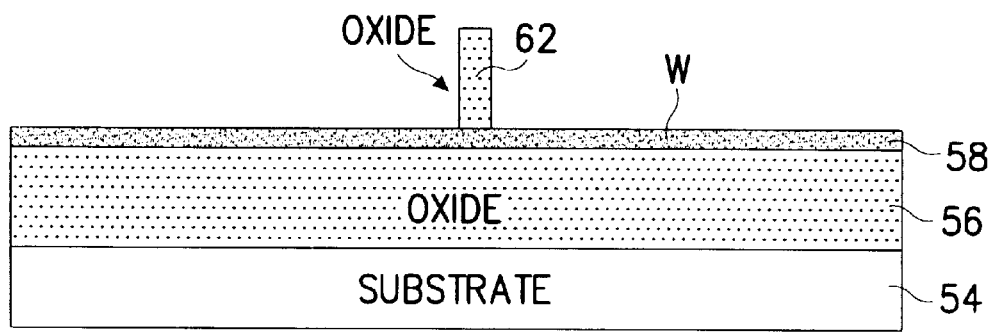
Figure 4D:
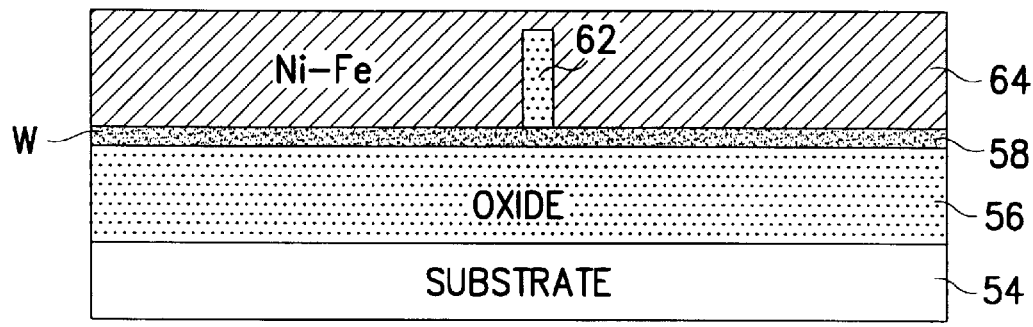
Figure 4E:
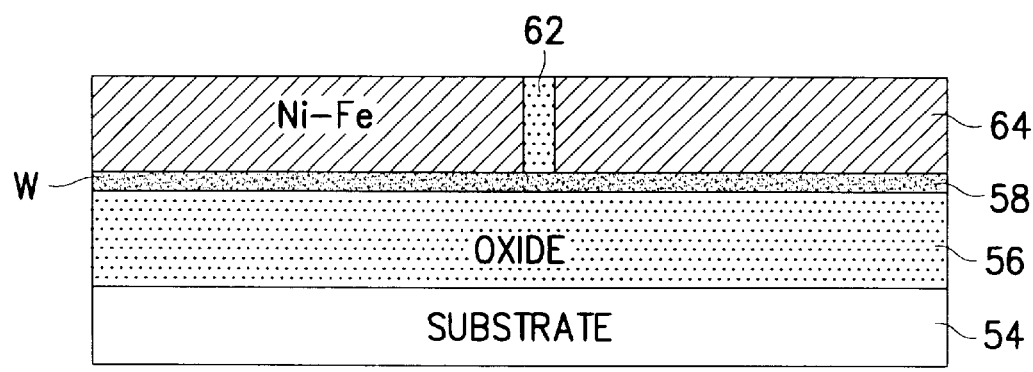

The gap forming process of forming a gap 114 between the pole tips of the upper pole piece 106 of a planar silicon head is illustrated in FIGS. 4A to 4E. An oxide layer 56 and a tungsten layer 58 are sequentially deposited on a silicon substrate 54, and an oxide spacer 62 is formed at a side wall of a thick photoresist 60 as shown in FIGS. 4A to 4C. A permalloy (NiFe) layer 64 which is the upper pole piece 106 of the planar silicon head shown in FIG. 1 is formed by electroplating and the permalloy layer 64 is planarized as shown in FIGS. 4D and 4E.

The bump forming process of forming bumps 126 and 128 positioned at the rear of the planar silicon head is shown in FIGS. 5A to 5F. Like a semiconductor multi-chip module technique, the bump forming process is to form the nickel (Ni) bumps (126 and 128 shown in FIG. 1) positioned at the rear of the head and to connect the bumps to the wired suspension of the actuator by low-temperature soldering.

Figure 5A:
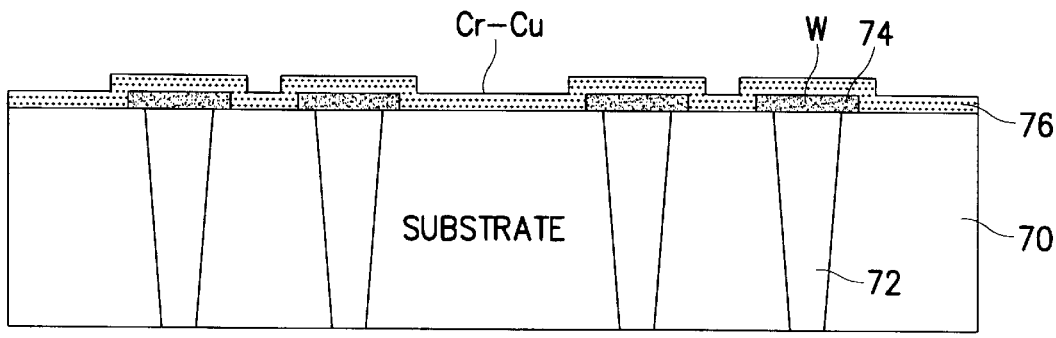
FIGS. 5A to 5F are vertical cross-sectional views illustrating a bump forming process of a planar silicon head.
Figure 5B:
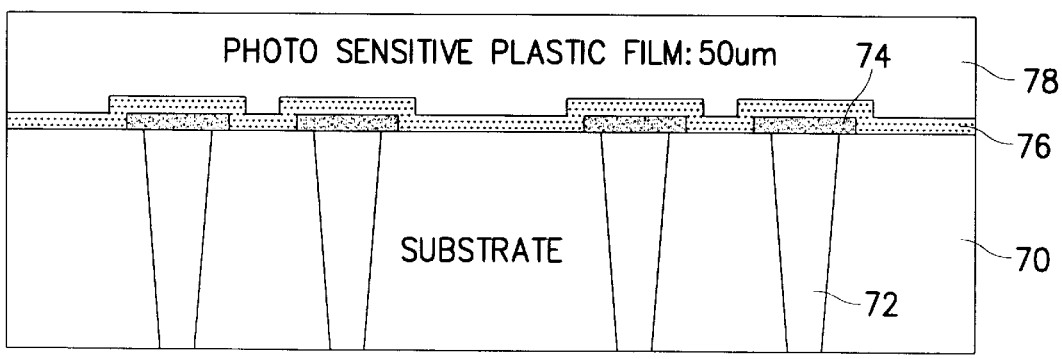
Figure 5C:
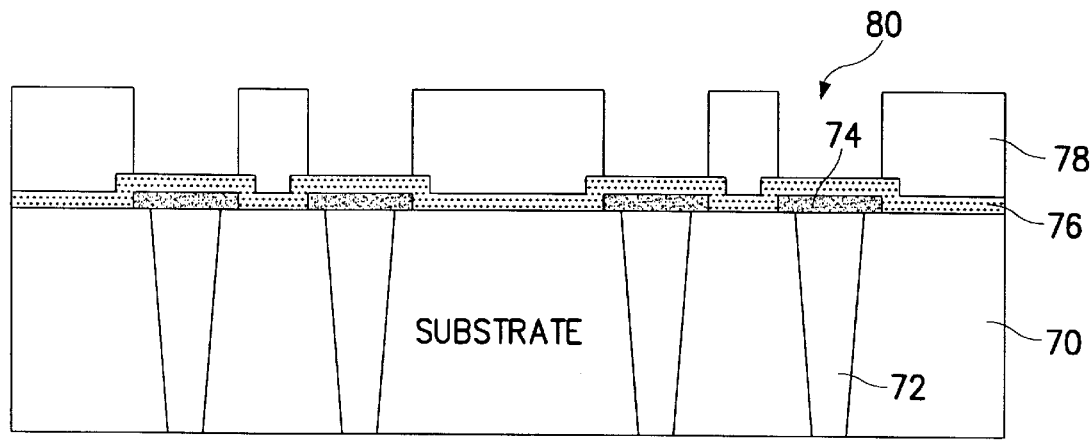
Figure 5D:
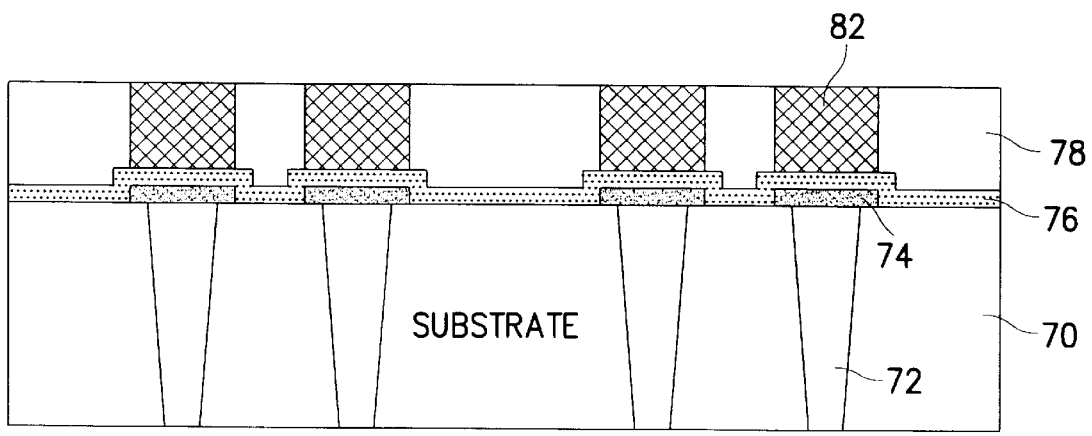
Figure 5E:
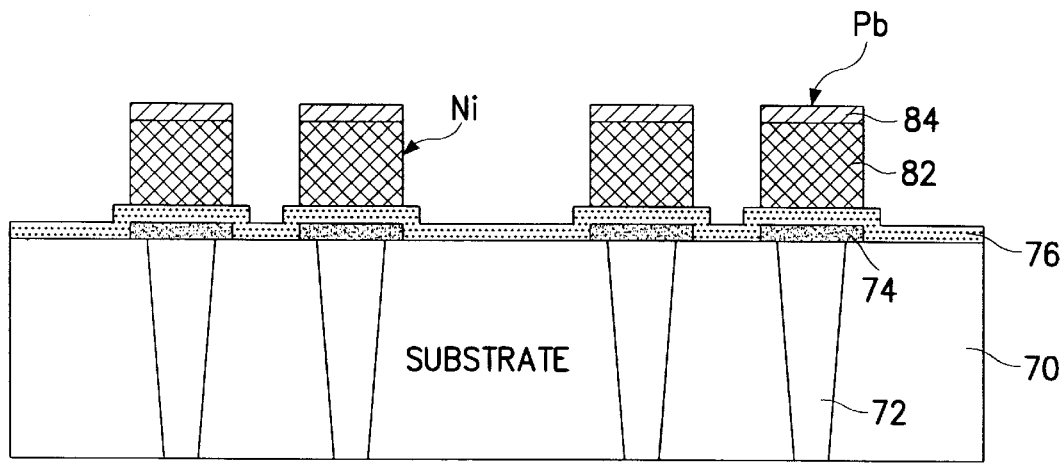
Figure 5F:
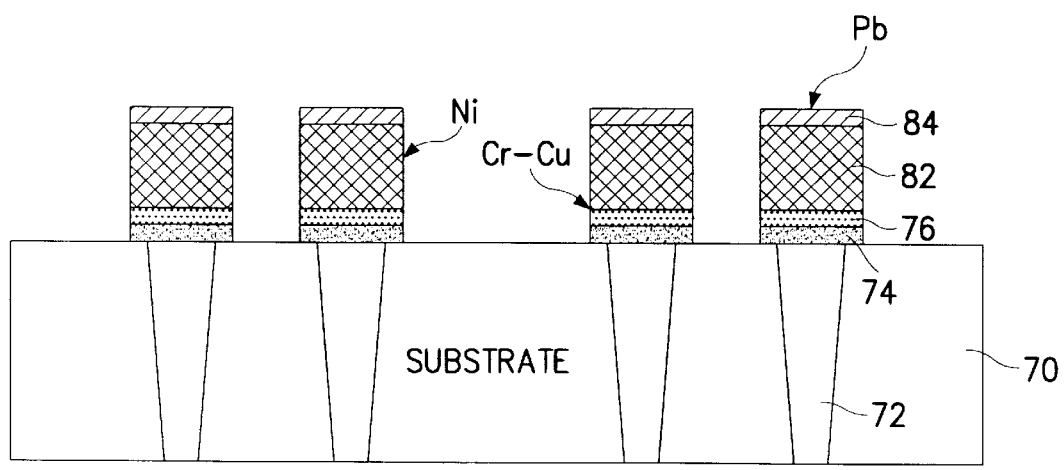

A hole 72 with a wider width at the front of the head than at the rear thereof is formed in a substrate 70. A tungsten (W) electrode 74 is formed through the inner wall of the hole 72 and a chromium-copper (Cr—Cu) layer 76 is formed on the entire surface of the substrate 70 as shown in FIG. 5A. A photosensitive plastic film 78 is coated on the Cr—Cu layer 76 as shown in FIG. 5B. A region 80 for forming the bump is formed by lithography as shown in FIG. 5C. A nickel layer 82 is formed on the Cr—Cu layer 76 positioned on the tungsten electrode 74 by electroplating as shown in FIG. 5D. A plumbum (Pb) lead 84 is formed on the nickel layer 82 and the coated photosensitive plastic film 78 is removed as shown in FIG. 5E. The Cr—Cu layer 76 formed under the removed photosensitive plastic film 78 is etched, thus to form the electrode.

In order to strengthen the internal connector that is connected to the coil of a planar silicon head against the overcurrent/overvoltage, a preferred embodiment of the present invention contemplates the internal connector or the bump comprised of a conductive polymer layer. The conductive polymer has high conductibility with respect to a rated current and a rated voltage but it changes into an insulator if the overcurrent or overvoltage is applied. Therefore, even if the overcurrent or overvoltage is applied to the head, the conductive polymer protects the planar silicon head from the overcurrent/overvoltage.

Figure 6A:
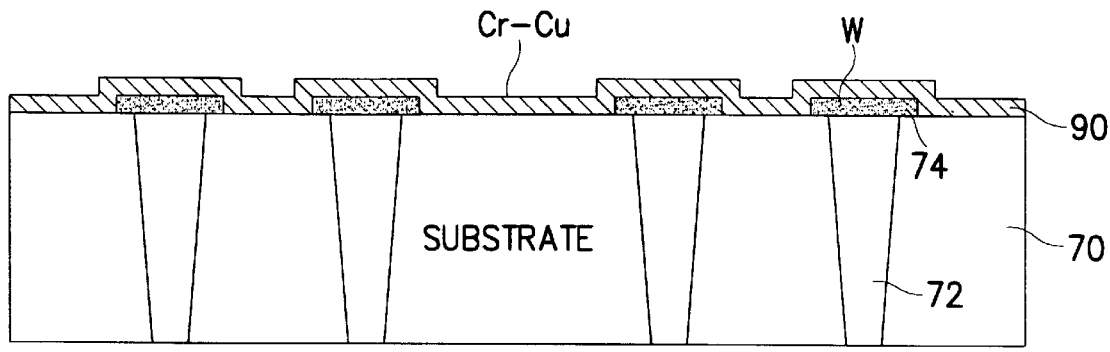
FIGS. 6A to 6G are vertical cross-sectional views illustrating a bump forming process of a planar silicon head according to a preferred embodiment of the present invention.

Now, the bump forming process of forming bumps positioned at the rear of a planar silicon head according to the principles of the present invention is shown in FIGS. 6A to 6G. The hole 72 with a wider width at the front of the head than at the rear thereof is formed at the substrate 70, and the tungsten electrode 74 is formed through the inner wall of the hole 72. Unlike the bump forming process as illustrated in FIG. 5A, a conductive polymer layer 90 is deposited on the entire surface of the silicon substrate 70 as shown in FIG. 6A. Preferably, the conductive polymer layer 90 is formed with a thickness of 10–18 μm. As described above, the conductive polymer layer 90 has high conductibility with respect to the rated current and rated voltage but it changes into an insulator if the overcurrent or overvoltage is applied.

Figure 6B:
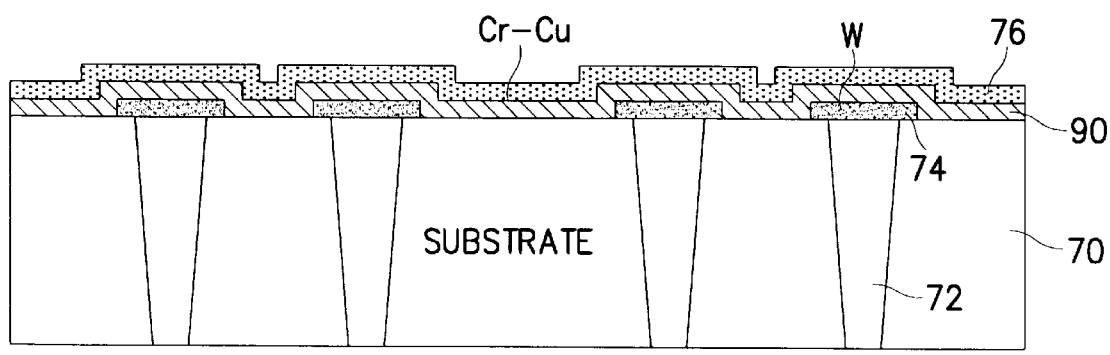
Figure 6C:
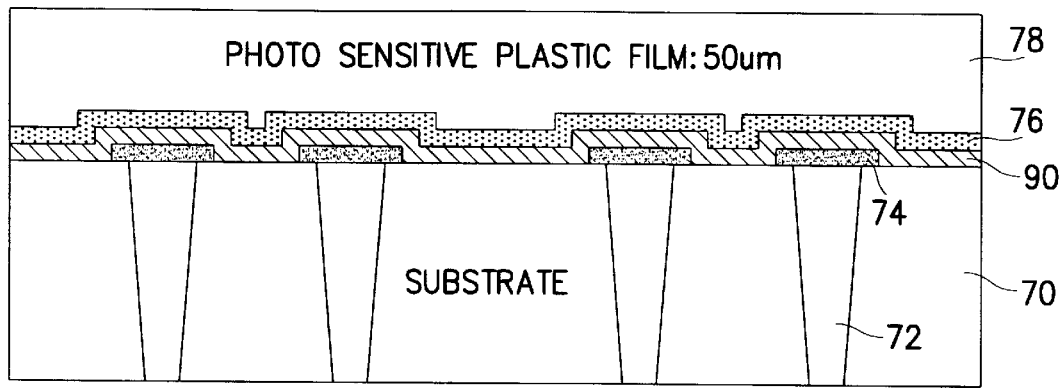
Figure 6D:
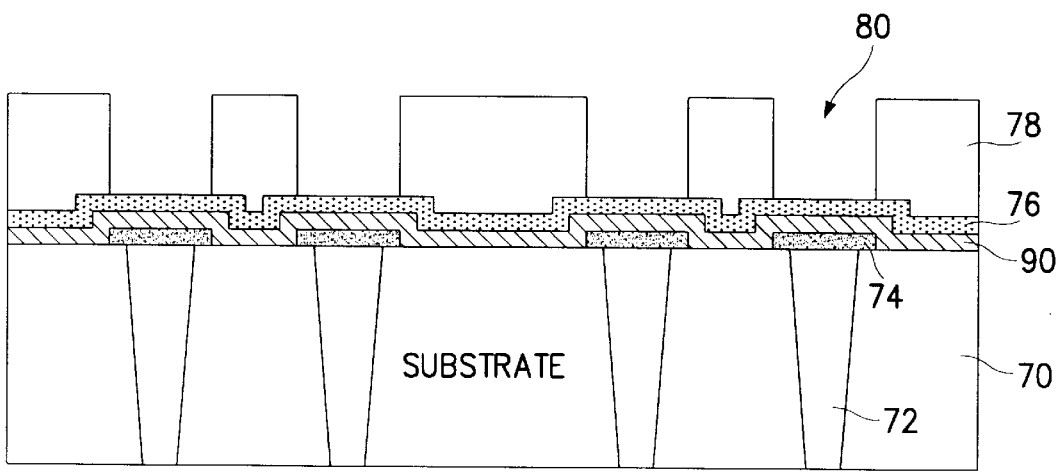
Figure 6E:
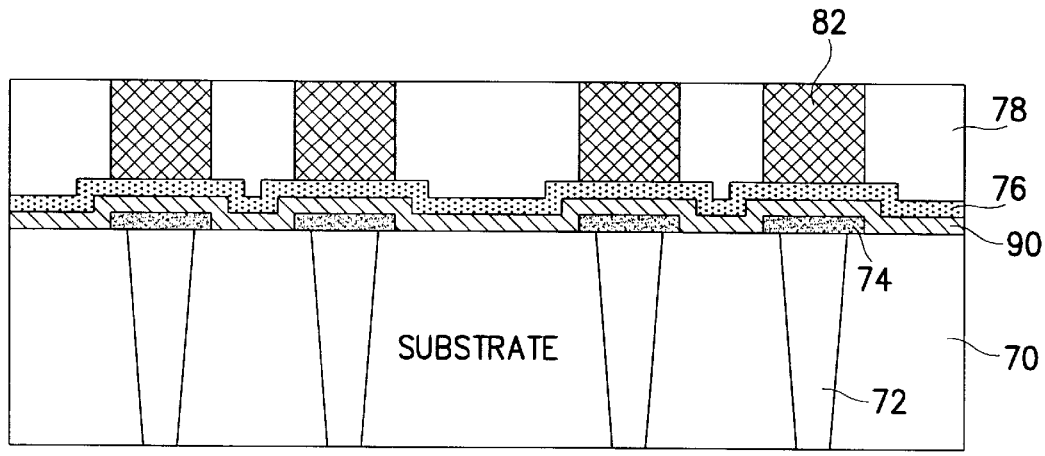
Figure 6F:
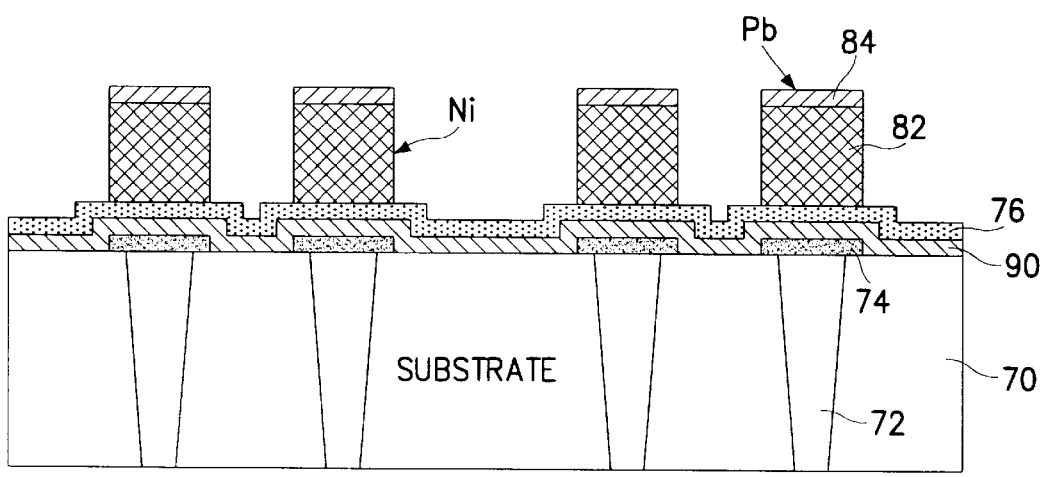
Figure 6G:
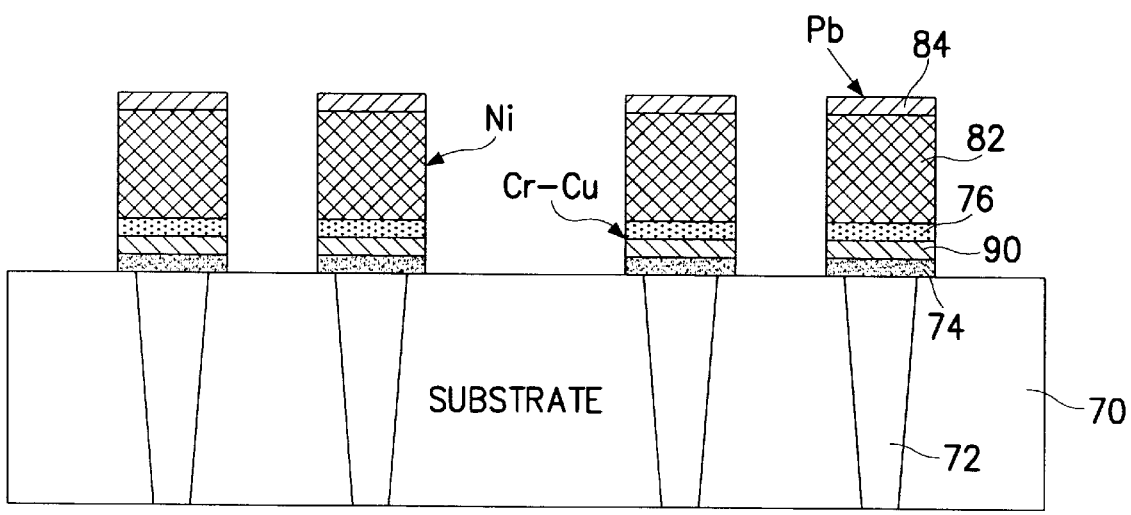

The chromium-copper (Cr—Cu) layer 76 is then formed on the conductive polymer layer 90 as shown in FIG. 6B. Therefore, the conductive polymer layer 90 is situated between the tungsten electrode 74 and the Cr—Cu layer 76. The photosensitive plastic film 78 is coated on the Cr—Cu layer 76 as shown in FIG. 6C. A region 80 for forming the bump is formed by lithography as shown in FIG. 6D. The nickel layer 82 is formed on the Cr—Cu layer 76 positioned over the tungsten electrode 74 by electroplating as shown in FIG. 6E. The plumbum (Pb) lead 84 is formed on the nickel layer 82 and the coated photosensitive plastic film 78 is removed as shown in FIG. 6F. The Cr—Cu layer 76 and the conductive polymer layer 90 formed under the removed photosensitive plastic film 78 are etched, thus to form the electrode.

Thus, if the bump includes the conductive polymer layer 90 by the above bump forming process, the conductive polymer layer 90 protects the head from the overcurrent or overvoltage. If the rated current or rated voltage is applied, the planar silicon head becomes conductive by the high conductibility of the conductive polymer layer 90. Although the conductive polymer layer 90 is inserted between the tungsten electrode 74 and the Cr—Cu layer 76, it may be inserted between other layers within the bump.

Although not shown in FIG. 2E, the polycrystalline silicon layer 34 and the oxide layer 32 formed on the tungsten electrode 36 are removed and a permalloy layer is formed. In this case, the conductive polymer layer may be also formed between the tungsten electrode 36 formed during the drilling process and the permalloy layer by electroplating. The permalloy layer is connected to the coil of the head. As noted previously, in a fabricating process of the planar silicon head, since the conductive polymer layer which changes into an insulator when the overcurrent or overvoltage is applied is formed at a current incoming line of the head, the planar silicon head is protected from the overcurrent.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A planar silicon head with a structure protected from overvoltage and overcurrent, comprising:
    a silicon substrate having at least a hole formed therein, said hole having a conductive layer deposited thereon;
    a yoke and conduction coils formed on a silicon substrate, said yoke having a gap for reading and writing data on a storage medium;
    an internal connector formed at one end of said hole, and electrically connected to the conduction coils; and
    a bump having at least a conductive polymer layer formed at the other end of said hole, said conductive polymer layer exhibiting characteristics of an insulator when one of a current over a rated current and a voltage over a rated voltage is applied to the conduction coils.

2. The planar silicon head of claim 1, further comprised of said conductive polymer layer having a thickness of approximately 10–18 micrometers (μm).

3. The planar silicon head of claim 1, further comprised of said conductive layer deposited in the hole being a tungsten electrode.

4. The planar silicon head of claim 1, further comprised of said bump further comprising a chromium-copper layer formed on said conductive polymer layer deposited on the other end of said hole, a nickel layer formed on the chromium-copper layer, and a plumbum lead formed on the nickel layer.

5. The planar silicon head of claim 1, further comprised of said conductive polymer layer exhibiting high conductivity with respect to the rated current and the rated voltage, but exhibiting insulative electrical properties when the current applied or the voltage applied to the conduction coils is over the rated current or the rated voltage.

6. The planar silicon head of claim 1, further comprised of said conductive polymer layer being formed by electroplating.

7. A planar silicon head with a structure protected from an overvoltage and an overcurrent, comprising:
    a yoke and conduction coils formed on a silicon substrate, said yoke having a gap for reading and writing data;
    a hole formed in said silicon substrate, said hole having a wide end and a tapered, narrow end;
    an internal connector formed at said tapered narrow end of said hole drilled at a front side of said silicon substrate, said internal connector electrically connected to said conduction coils;
    and
    a bump formed at said wide end of said hole, said bump comprising a plurality of layers stacked one on top of each other, a layer adjacent to said wide end of said hole being said conductive layer, one of said plurality of layers of said bump being a conductive polymer layer.

8. The planar silicon head of claim 7, further comprised of said conductive polymer layer exhibiting high conductibility with respect to a rated current and a rated voltage but exhibiting insulative electrical properties with respect to an overcurrent and an overvoltage.

9. The planar silicon head of claim 7, further comprised of said conductive polymer layer being formed by electroplating.

10. The planar silicon head of claim 7, further comprised of said conductive polymer layer having a thickness of approximately 10–18 micrometers (μm).

11. The planar silicon head of claim 7, wherein said conductive layer deposited in the hole of said silicon substrate being tungsten.

12. The planar silicon head of claim 7, wherein said plurality of layers being arranged such that said conductive polymer layer being formed on said conductive layer, a chromium-copper layer being formed on said conductive polymer layer, a nickel layer being formed on said chromium-copper layer, and a plumbum lead layer being formed on said nickel layer.

13. A planar silicon head with a structure protected from overvoltage and overcurrent, comprising:
- a silicon substrate having at least a hole formed therein, said hole having a conductive layer deposited therein, said hole being tapered and having a wider width at a front of said substrate and having a narrower width at a back of said substrate;
- a yoke and conduction coils formed on said silicon substrate, said yoke having a gap for reading and writing data on a storage medium;
- an internal connector formed at an end of said hole at said back of said substrate, said internal connector connected to said conduction coils; and
- a bump having at least a conductive polymer layer formed at the front side of said substrate, forming an electrode, said conductive polymer layer exhibiting characteristics of an insulator when one of a current over a rated current and a voltage over a rated voltage is applied to the electrode.

14. The planar silicon head of claim 13, further comprised of said bump further comprising a chromium-copper layer formed on said conductive polymer layer deposited on the front side of said hole perforating said substrate, a nickel layer formed on the chromium-copper layer, and a lead layer formed on the nickel layer for forming said electrode.

15. The planar silicon head of claim 13, further comprised of said conductive polymer layer exhibiting high conductivity with respect to the rated current and the rated voltage, but changing into said insulator when the current applied or the voltage applied to the conduction coils is over the rated current or the rated voltage.

* * * * *